United States Patent
Wanner et al.

(10) Patent No.: US 10,384,579 B1
(45) Date of Patent: Aug. 20, 2019

(54) SEAT GAP GUARDING APPARATUS

(71) Applicant: Rockwell Collins, Inc., Cedar Rapids, IA (US)

(72) Inventors: Jackson R. Wanner, Winston-Salem, NC (US); Ethan C. Huffman, Winston-Salem, NC (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/987,588

(22) Filed: May 23, 2018

(51) Int. Cl.
| | |
|---|---|
| *B60N 2/90* | (2018.01) |
| *A47C 15/00* | (2006.01) |
| *A47C 7/62* | (2006.01) |
| *B64D 11/06* | (2006.01) |
| *B61D 33/00* | (2006.01) |
| *B60N 2/20* | (2006.01) |
| *B63B 29/04* | (2006.01) |
| *B60N 2/24* | (2006.01) |

(52) U.S. Cl.
CPC .......... *B60N 2/90* (2018.02); *A47C 7/62* (2013.01); *A47C 15/00* (2013.01); *B60N 2/20* (2013.01); *B60N 2/242* (2013.01); *B61D 33/0007* (2013.01); *B63B 2029/043* (2013.01); *B64D 11/064* (2014.12)

(58) Field of Classification Search
CPC .......... A47D 15/00; B60N 2/90; A47C 7/62
See application file for complete search history.

(56) References Cited

U.S. PATENT DOCUMENTS

| | | | | |
|---|---|---|---|---|
| 1,663,126 A | * | 3/1928 | Hansen | B60N 2/7035 297/182 |
| 2,571,574 A | * | 10/1951 | Hicks | B60N 2/6054 297/182 |
| 2,836,229 A | * | 5/1958 | Spetner | A47C 7/62 297/182 |
| 4,948,195 A | * | 8/1990 | Saunders | B60N 2/91 297/182 |
| 5,887,941 A | * | 3/1999 | Kopinski | B60N 2/24 297/182 |
| 6,022,072 A | * | 2/2000 | Moyer | A47C 7/62 248/909 |
| 7,527,314 B2 | * | 5/2009 | Dohan | B60R 11/00 296/37.8 |
| 7,644,984 B2 | * | 1/2010 | Chalhoub | B60N 2/58 297/113 |
| 7,758,090 B2 | * | 7/2010 | Gregory | B60R 11/00 296/1.07 |

(Continued)

*Primary Examiner* — Timothy J Brindley
(74) *Attorney, Agent, or Firm* — Angel N. Gerdzhikov; Donna P. Suchy; Daniel M. Barbieri

(57) ABSTRACT

A seat gap guarding apparatus is disclosed. In embodiments, the seat gap guarding apparatus includes a support member configured to be coupled to a repositionable seat and one or more deformable guard members fixed to the support member. The one or more deformable guard members are configured to press against a surface adjacent to the repositionable seat to keep objects and/or debris from falling into the gap between the repositionable seat and the surface adjacent to the repositionable seat. When the repositionable seat is transitioned from a first position to a second position, the support member is configured to maintain the one or more deformable guard members pressed against the surface adjacent to the repositionable seat.

18 Claims, 7 Drawing Sheets

(56) References Cited

U.S. PATENT DOCUMENTS

| | | | | |
|---|---|---|---|---|
| 8,056,970 | B1* | 11/2011 | Phillips | B60N 2/6009 |
| | | | | 296/1.07 |
| 8,162,189 | B2* | 4/2012 | Robins | B60R 7/08 |
| | | | | 224/275 |
| 8,267,291 | B2* | 9/2012 | Simon | B60R 11/00 |
| | | | | 224/275 |
| 9,174,561 | B1* | 11/2015 | Ferlisi Wilson | B60N 3/00 |
| 9,185,986 | B2* | 11/2015 | Marvin | A47C 7/62 |
| 9,701,233 | B1* | 7/2017 | Farooq | B60N 2/6009 |
| 2010/0148563 | A1* | 6/2010 | Fera | A47C 7/62 |
| | | | | 297/463.1 |
| 2015/0076872 | A1* | 3/2015 | Carithers | A47C 7/62 |
| | | | | 297/182 |

* cited by examiner

SEAT GAP GUARDING APPARATUS

BACKGROUND

Vehicles for mass transport can include, but are not limited to, aircrafts, boats, trains, and busses. The passenger cabins in these types of vehicles are typically designed for long travel durations (e.g., one or more hours of travel). As such, the passenger cabins can include reclining chairs that allow passengers to rest or sleep comfortably during travel.

Passenger chairs can include mechanical linkages that allow the chairs to recline or reposition and possibly one or more actuators (e.g., electric motors, pneumatic linear actuators, or the like) that assist with reclining or repositioning processes. Because of the increasingly complex mechanical linkages, actuators, and/or electrical elements built into such chairs, there is a need for devices to prevent objects or debris from falling into seat gaps (e.g., between a seat and an adjacent surface) and potentially jamming or damaging the underlying components.

SUMMARY

In one aspect, embodiments of the inventive concepts disclosed herein are directed to a seat gap guarding apparatus. In embodiments, the seat gap guarding apparatus includes a support member configured to be coupled to a repositionable seat and one or more deformable guard members fixed to the support member. The one or more deformable guard members are configured to press against a surface adjacent to the repositionable seat to keep objects and/or debris from falling into the gap between the repositionable seat and the surface adjacent to the repositionable seat. When the repositionable seat is transitioned from a first position to a second position, the support member is configured to maintain the one or more deformable guard members pressed against the surface adjacent to the repositionable seat.

In another aspect, embodiments of the inventive concepts disclosed herein are directed to a passenger chair that includes a repositionable seat gap guarding apparatus. In embodiments, the passenger chair includes a repositionable upper body support member and a repositionable seat configured to move relative to the repositionable upper body support member. The passenger chair further includes a support member coupled to the repositionable upper body support member and/or the repositionable seat. One or more deformable guard members are fixed to the support member and configured to press against a surface adjacent to the repositionable upper body support member and/or the repositionable seat. When at least one of the repositionable upper body support member or the repositionable seat is transitioned from a first position to a second position, the support member is configured to maintain the one or more deformable guard members pressed against the surface.

In some embodiments, the passenger chair further includes at least one stationary seat gap guarding apparatus that interfaces with the repositionable seat gap guarding apparatus to further prevent objects and/or debris from falling into a seat gap. For example, the passenger chair can include an arm rest console and a support member coupled to the arm rest console. The support member can have one or more stationary deformable guard members fixed to the support member, wherein the one or more repositionable deformable guard members that are coupled to the support member are configured to press against the arm rest console and/or the one or more stationary deformable guard members. When at least one of the repositionable upper body support member or the repositionable seat is transitioned from a first position to a second position, the support member is configure to maintain the one or more repositionable deformable guard members pressed against the arm rest console and/or the one or more stationary deformable guard members.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
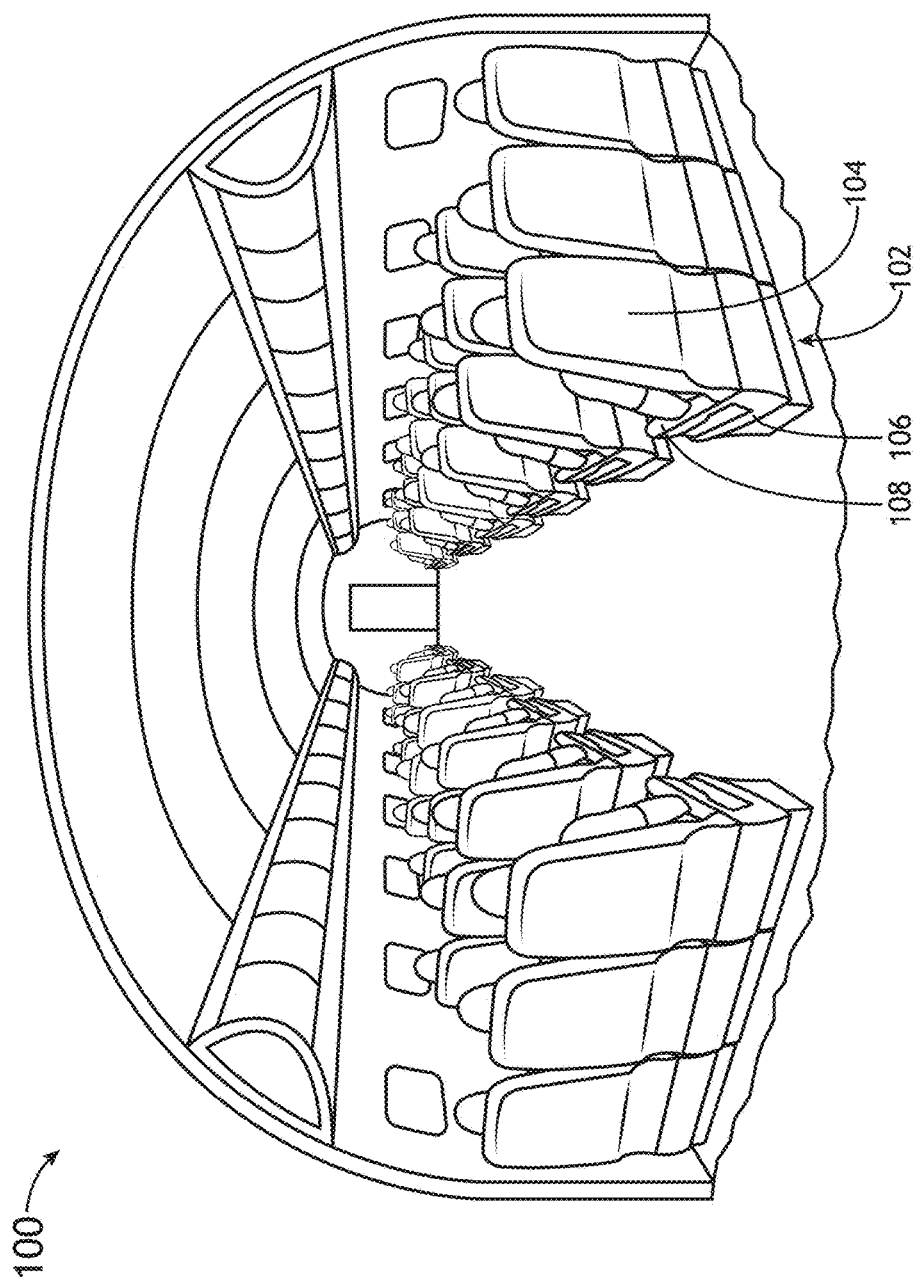
FIG. 1 illustrates an example environment in which a seat gap guarding apparatus can be employed, in accordance with an example embodiment of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a seat gap guarding apparatus. Passenger chairs in aircrafts and other vehicles are incorporating increasingly complex structures that include mechanical linkages, actuators, and/or electrical elements for reclining and/or repositioning the chairs. These structure are vulnerable to damage from objects or debris falling into seat gaps and jamming or otherwise damaging the underlying components. In embodiments, a seat gap guarding apparatus can include one or more deformable guard members (e.g., brushes) that move with a repositionable seat of a passenger chair to prevent objects (e.g., phones, forks, knives, etc.) from falling past the seat cushion and getting caught in the mechanical linkages of the passenger chair and/or damaging the actuators, electrical elements, and so forth.

Closing out seat gaps can be difficult to achieve because of the need to deal with tolerances of seats, cushions, shrouds and so forth. In addition, having the limitation of no hard contact between the moving seat and surrounds shrouds and structures further makes the issues more difficult. Therefore a deformable/soft contact close out is desirable.

FIG. 1 illustrates an example environment 100 (e.g., an aircraft cabin) that includes a plurality of passenger chairs 102. In embodiments, a passenger chair 102 includes an upper body support member 104 (e.g., a seat back) and a seat 106. In some embodiments, the upper body support member 104 and the seat 106 may be separate structures disposed adjacent to one another. Alternatively, the upper body support member 104 and the seat 106 can have one or more shared components. For example, the upper body support member 104 and the seat 106 can have a shared cushion or covering, one or more shared mechanical linkages, and/or one or more shared actuators. The upper body support member 104 may be configured to move relative to the seat 106. For example, the upper body support member 104 can be configured to transition between upright and reclined positions. In some embodiments, the seat 106 is also repositionable. For example, the seat 106 may be configured to move forward/backward, upward/downward, and/or tilt. The seat 106 and the upper body support member 104 may be simultaneously actuated to transition from a sitting to a laying position. For example, the seat 106 may actuate forwards while the upper body support member 104 reclines to place the passenger chair 102 in a bed-like configuration. In some embodiments, the passenger chair 102 can also include one or more armrests 108 or armrest consoles adjacent to (e.g., on a left or right side) of the seat 106.

Figure 2:
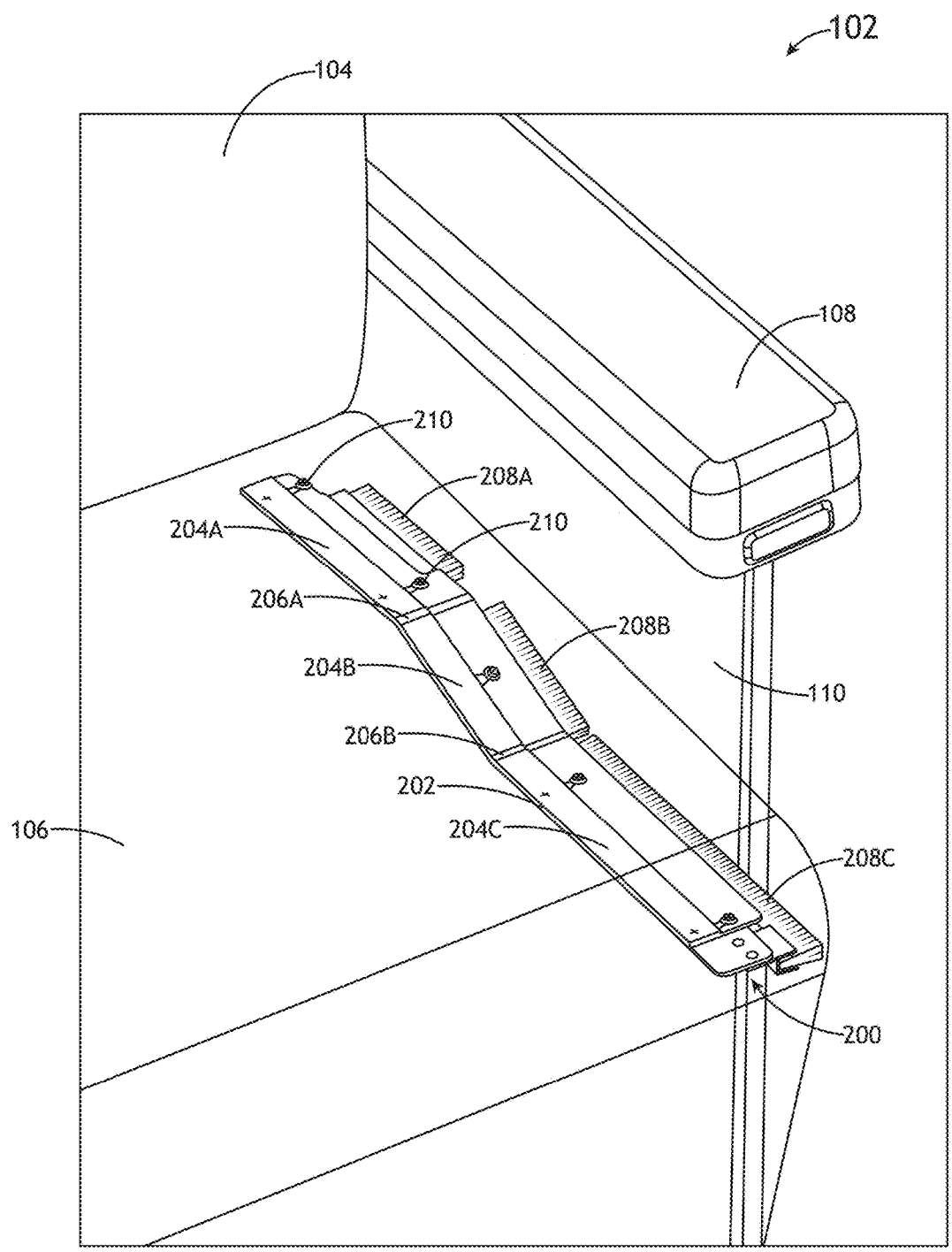
FIG. 2 is a partial perspective view of a passenger chair with a seat gap guarding apparatus, in accordance with an example embodiment of this disclosure.
Figure 3:
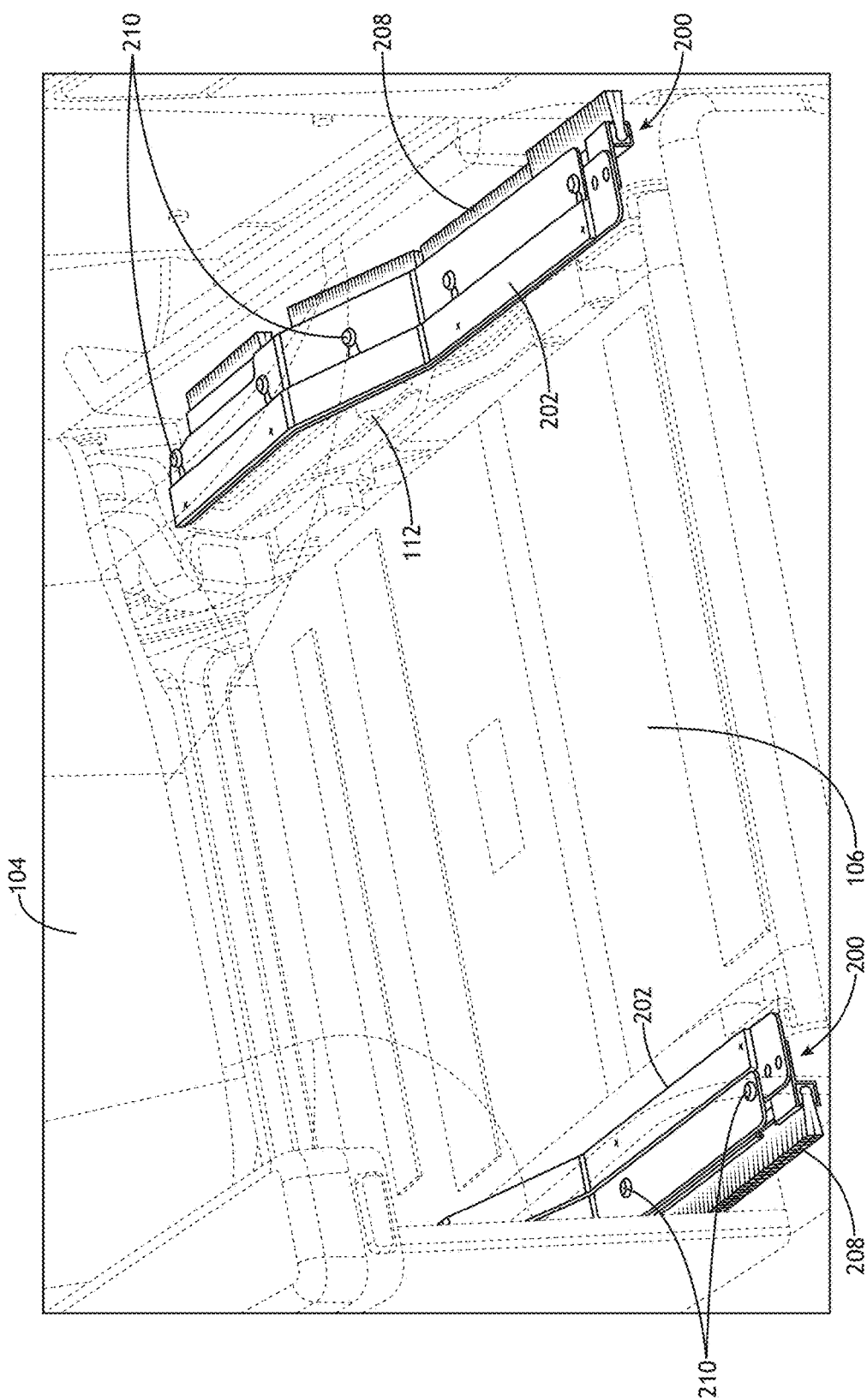
FIG. 3 is a partial perspective view of a passenger chair with a plurality of seat gap guarding apparatuses, in accordance with an example embodiment of this disclosure.
Figure 4:
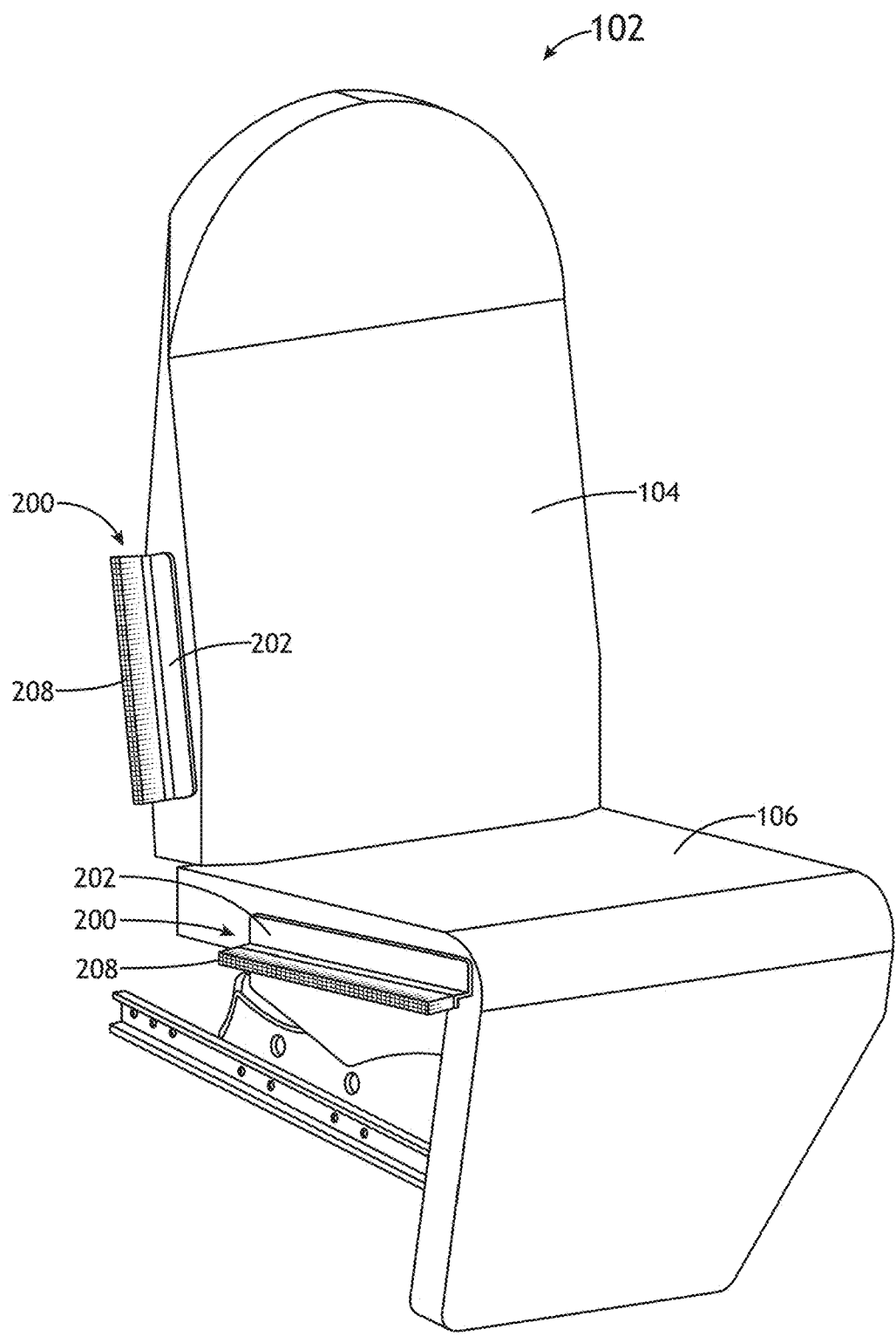
FIG. 4 is a perspective view of a passenger chair with a plurality of seat gap guarding apparatuses, in accordance with an example embodiment of this disclosure.

Referring now to FIGS. 2 through 7, example embodiments of a seat gap guarding apparatus 200 for a passenger chair 102 are described. As shown in FIG. 2, the seat gap guarding apparatus 200 includes at least one support member 202 and one or more deformable guard members 208 (e.g., brushes, foam members, or the like) fixed to the support member 202. In some embodiments, the support member 202 is a flexible support member. For example, the support member 202 can comprise a flexible substrate and/or a plurality of segments (e.g., segments 204A, 204B, 204C, etc.) with flexible joints (e.g., joints 206A, 206B, etc.) in between adjacent segments of the plurality of segments. In embodiments where the support member 202 includes a plurality of segments, the segments may each have a respective deformable guard member 208 or set of deformable guard members 208. For example, FIG. 2 illustrates the support member 202 including segments 204A, 204B, and 204C with respective deformable guard members 208A, 208B, and 208C. The embodiments illustrated in FIGS. 2 and 3 are provided as examples; however, in other embodiments, the support member 202 may have any number of segments 204 (or may be continuous and/or rigid, e.g., as shown in FIG. 4) and can have any number of deformable guard members 208 fixed to the support member 202.

The support member 202 can be coupled to moving components of the seat 106 (i.e., where the seat 106 is a repositionable seat). For example, as shown in FIG. 3, the support member 202 may be coupled to one or more mechanical linkages 112 disposed beneath the seat cushion. In some embodiments, the seat gap guarding apparatus 200 includes one or more fasteners 210 configured to secure the support member 202 to the one or more mechanical linkages 112. Referring again to FIG. 2, the one or more deformable guard members 208 are configured to press against a surface 110 adjacent to the seat 106 to keep objects and/or debris from falling into the gap between the seat 106 and the adjacent surface 110. For example, in the embodiment illustrated in FIG. 2, the surface 110 is a portion of an armrest 108 adjacent to the seat 106. In other embodiments, the surface 110 may be an inner wall of a passenger cabin (e.g., an aircraft cabin), or a portion of a console or another chair.

The support member 202 is configured to maintain the one or more deformable guard members 208 pressed against the surface 110, thereby closing the gap between the seat 106 and the surface 110 so that objects and/or debris cannot fall into the gap. When the seat 106 is transitioned from a first position to a second position, the support member 202 is configured to at least partially bend, unbend, flex, or unflex in order to maintain the one or more deformable guard members 208 pressed against the surface 110. For example, at least a portion of the support member 202 can be configured to bend or flex when the seat 106 is transitioned from a reclined position to an upright position and/or can be configured to unbend or unflex when the seat 106 is transitioned from an upright position to a reclined position, or vice versa.

The passenger chair 102 may include a plurality of seat gap guarding apparatuses 200. In the example embodiment illustrated in FIG. 3, the passenger chair 102 is shown with a seat gap guarding apparatus 200 located on each side of the seat 106. For example, the seat gap guarding apparatuses 200 may be located between the seat 106 and armrests 108 located on each side of the seat 106. In another example, the seat gap guarding apparatuses 200 may be located between the seat 106 and seats of other chairs. In yet another example, the seat gap guarding apparatuses 200 may be located between a combination of features (e.g., an arm rest and a wall, an arm rest and another seat, another seat and a wall, a center console and a wall, etc.).

Figure 5:
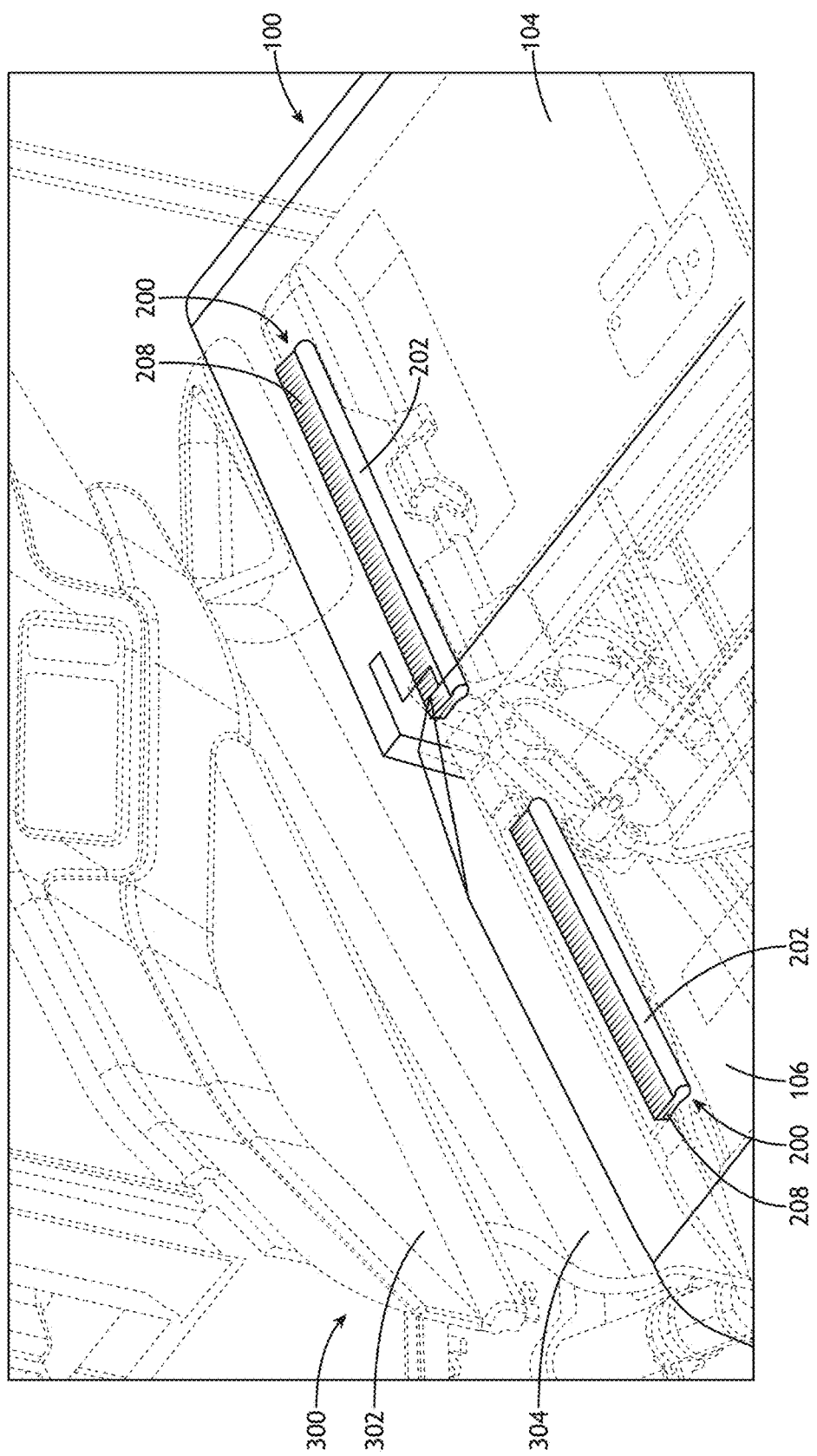
FIG. 5 is a partial perspective view of a fully reclined passenger chair with a plurality of seat gap guarding apparatuses, in accordance with an example embodiment of this disclosure.

In another example embodiment shown in FIGS. 4 and 5, the passenger chair 102 includes at least one seat gap guarding apparatus 200 attached to a side portion of the upper body support member 104 and at least one seat gap guarding apparatus 200 attached to a side portion of the seat 106. As shown in FIG. 5, the support members 202 of the seat gap guarding apparatuses 200 attached to the upper body support member 104 and the seat 106 are fixed to respective deformable guard members 208 and are configured to press the deformable guard members 208 against a surface 304 adjacent to the passenger chair 102. For example, the surface 304 can be a portion of console 300 (e.g., a media and/or comfort console) with an arm rest 302 and possibly other features (e.g., media devices, lighting, food and/or beverage holders, and so forth). In other embodiments, the adjacent surface 304 may be a portion of an inner wall of the passenger cabin, another chair, or the like. The seat gap guarding apparatus 200 attached to the side portion of the upper body support member 104 may be particularly useful when the passenger chair 102 is transitioned into a fully reclined (e.g., bed-like) configuration, where it is more likely that objects and/or debris may fall into the gap between the upper body support member 104 and the adjacent surface 304.

Figure 6:
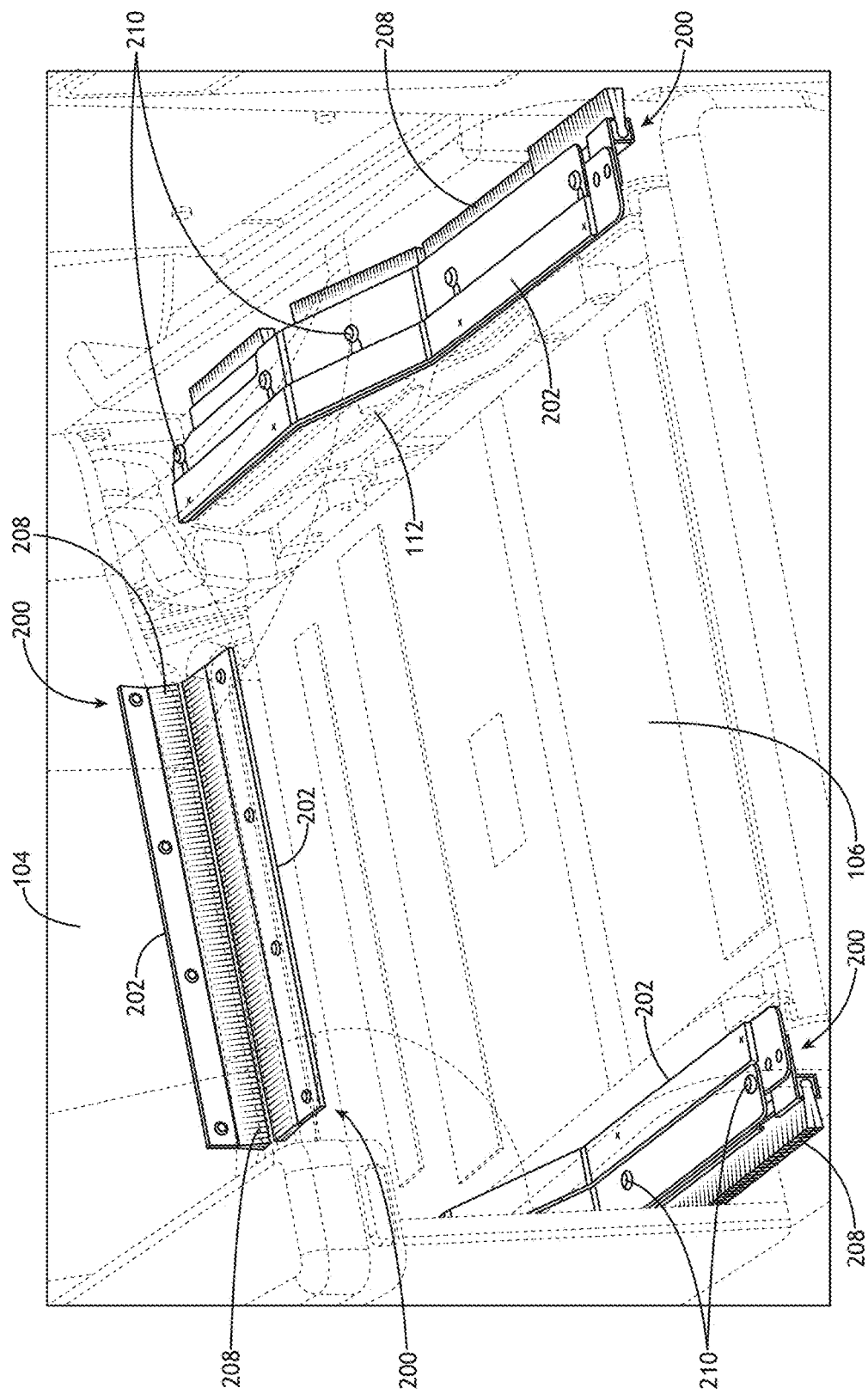
FIG. 6 is a partial perspective view of a passenger chair with a plurality of seat gap guarding apparatuses, in accordance with an example embodiment of this disclosure.

In another example embodiment shown in FIG. 6, the passenger chair 102 includes at least one seat gap guarding apparatus 200 attached to a bottom portion of the upper body support member 104 and at least one seat gap guarding apparatus 200 attached to a rear portion of the seat 106. In some embodiments, the passenger chair 102 includes one without the other. For example, the passenger chair 102 may include a seat gap guarding apparatus 200 attached to a bottom portion of the upper body support member 104 without a seat gap guarding apparatus 200 attached to a rear portion of the seat 106, or a seat gap guarding apparatus 200 attached to a rear portion of the seat 106 without a seat gap guarding apparatus 200 attached to a bottom portion of the upper body support member 104. The one or more seat gap guarding apparatuses 200 attached to the upper body support member 104 and/or the seat 106 can be configured to prevent objects and/or debris from falling to the gap between the upper body support member 104 and the seat 106. For example, the one or more deformable guard members 208 of a seat gap guarding apparatus 200 attached to the rear portion of the seat 106 can be configured to press against the bottom portion of the upper body support member 104 and/or against one or more deformable guard members 208 of a seat gap guarding apparatus 200 attached to the bottom portion of the upper body support member 104. Similarly, the one or more deformable guard members 208 of a seat gap guarding apparatus 200 attached to the bottom portion of the upper body support member 104 can be configured to press against the rear portion of the seat 106 and/or against one or more deformable guard members 208 of a seat gap guarding apparatus 200 attached to the rear portion of the seat 106. The one or more seat gap guarding apparatuses 200 attached to the upper body support member 104 and/or the seat 106 may be particularly useful when the passenger chair 102 is transitioned into a fully reclined (e.g., bed-like) configuration, where it is more likely that objects and/or debris may fall into the gap between the upper body support member 104 and the seat 106.

Figure 7:
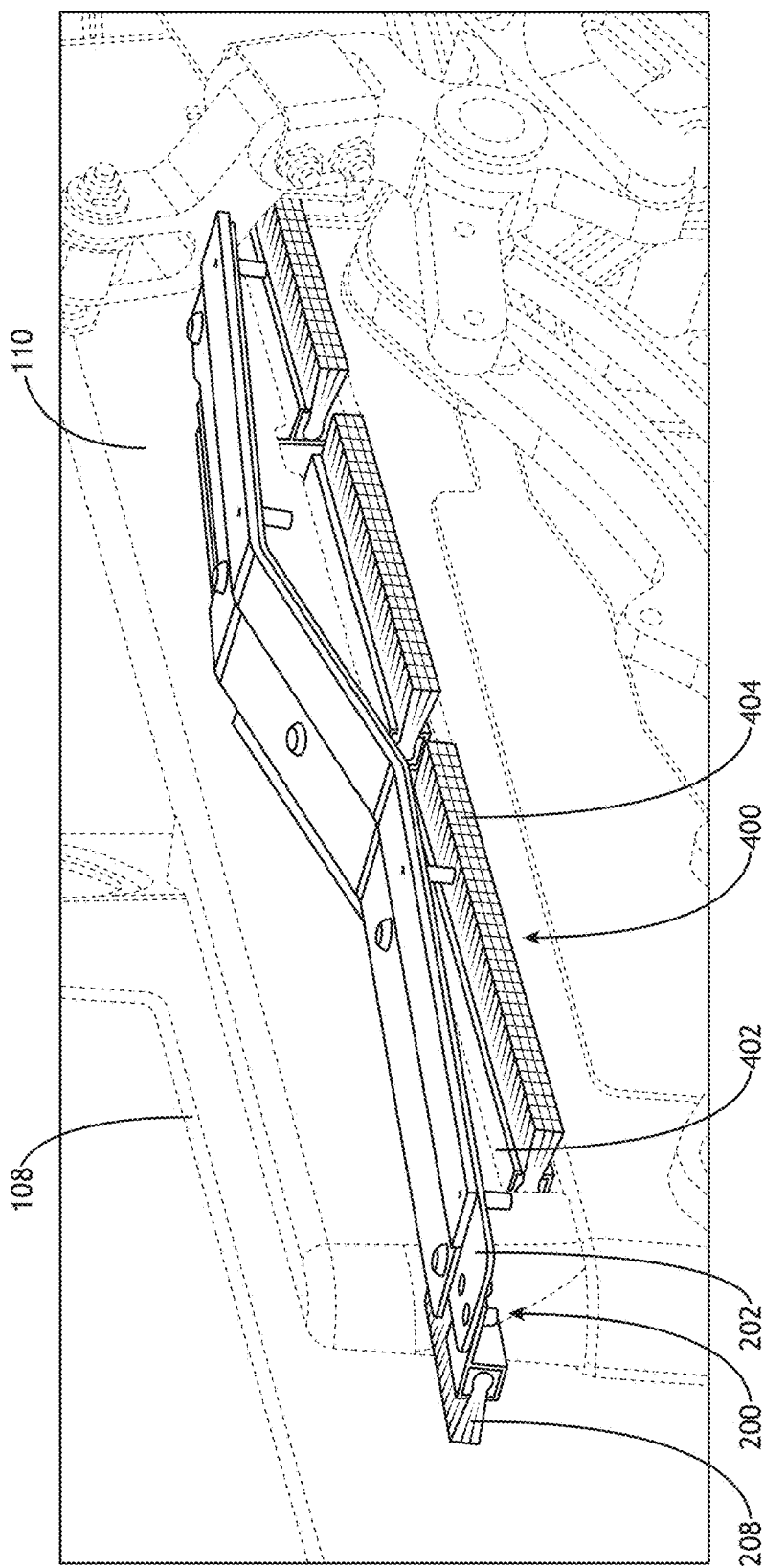
FIG. 7 is a partial perspective view of a passenger chair with at least one repositionable seat gap guarding apparatus and at least one stationary seat gap guarding apparatus, in accordance with an example embodiment of this disclosure.

In some embodiments, the passenger chair 102 includes at least one seat gap guarding apparatus attached to an adjacent surface 110 in addition to the seat gap guarding apparatus 200 that is attached to the seat 106 to further prevent objects and/or debris from falling into the gap between the seat 106 and an adjacent surface 110. For example, FIG. 7 illustrates another example embodiment of the passenger chair 102 with at least one seat gap guarding apparatus 200 attached to a side portion of the seat 106 and at least one seat gap guarding apparatus 400 protruding from the surface 110 of an armrest console 108. In some embodiments, the seat gap guarding apparatus 400 may protrude from any other surface adjacent to the seat 106 (e.g., a wall surface). The seat gap guarding apparatus 200 that is attached to the seat 106 may be repositionable and/or reconfigurable as described above. Meanwhile, the seat gap guarding apparatus 400 that protrudes from the surface 110 may be stationary. For example, the support member 402 of the stationary seat gap guarding apparatus 400 may be coupled to the surface 110 or another portion of the arm rest console 108 (or other adjacent non-moving structure). This support member 402 can have one or more stationary deformable guard members 404 fixed to the support member 402. The one or more deformable guard members 208 of the seat gap guarding apparatus 200 that is attached to the seat 106 may be configured to press against the surface 110 and/or against the one or more stationary deformable guard members 404. When the upper body support member 104 or the seat 106 is transitioned from a first position to a second position, at least a portion of the support member 200 that is coupled to the seat 106 can bend, flex, unbend, or unflex to maintain the one or more deformable guard members 208 of the repositionable seat gap guarding apparatus 200 pressed against the surface 110 and/or against the one or more stationary deformable guard members 404 of the stationary seat gap guarding apparatus 400. The stationary seat gap guarding apparatus 400 provides an added layer of protection against objects and/or debris falling into the gap between the seat 106 and the adjacent surface 110.

In embodiments, the one or more deformable guard members 208 include one or more brushes with densely packed bristles that create a soft closure around portions of the seat 106 and/or upper body support member 104. These brushes may be similar to the kind that are found on the bottom of a door, for example. One limitation of nylon brushes is that they may be flammable and difficult to certify for aircraft implementations. To better support aircraft implementations, the one or more brushes may include bristles formed from a flame retardant material. For example, the bristles may be formed from horse hair, flame retardant nylon, or a combination thereof.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An apparatus for guarding a seat gap, comprising:
a support member configured to be coupled to a repositionable seat; and
one or more deformable guard members fixed to the support member, the one or more deformable guard members configured to press against a surface adjacent to the repositionable seat, wherein the support member is configured to maintain the one or more deformable guard members pressed against the surface adjacent to the repositionable seat when the repositionable seat is transitioned from a first position to a second position,
wherein the support member comprises a flexible support member, and at least a portion of the flexible support member bends or unbends to maintain the one or more deformable guard members pressed against the surface adjacent to the repositionable seat when the repositionable seat is transitioned from a first position to a second position, and
wherein the flexible support member comprises a plurality of segments with flexible joints in between adjacent segments of the plurality of segments.

2. The apparatus of claim 1, wherein at least a portion of the flexible support member is configured to bend when the repositionable seat is transitioned from a reclined position to an upright position.

3. The apparatus of claim 1, wherein at least a portion of the flexible support member is configured to unbend when the repositionable seat is transitioned from an upright position to a reclined position.

4. The apparatus of claim 1, wherein the one or more deformable guard members comprise one or more brushes.

5. The apparatus of claim 4, wherein the one or more brushes include bristles formed from a flame retardant material.

6. The apparatus of claim 5, wherein the flame retardant material includes at least one of horse hair or a flame retardant nylon.

7. A passenger chair, comprising:
a repositionable upper body support member;
a repositionable seat;
a support member coupled to at least one of the repositionable upper body support member or the repositionable seat; and
one or more deformable guard members fixed to the support member, the one or more deformable guard members configured to press against a surface adjacent to the at least one of the repositionable upper body support member or the repositionable seat, wherein the support member is configured to maintain the one or more deformable guard members pressed against the surface when the at least one of the repositionable upper body support member or the repositionable seat is transitioned from a first position to a second position.

8. The passenger chair of claim 7, wherein the support member comprises a flexible support member, and at least a portion of the flexible support member bends or unbends to maintain the one or more deformable guard members pressed against the surface when the at least one of the repositionable upper body support member or the repositionable seat is transitioned from a first position to a second position.

9. The passenger chair of claim 8, wherein the flexible support member comprises a plurality of segments with flexible joints in between adjacent segments of the plurality of segments.

10. The passenger chair of claim 8, wherein at least a portion of the flexible support member is configured to bend when the at least one of the repositionable upper body support member or the repositionable seat is transitioned from a reclined position to an upright position.

11. The passenger chair of claim 8, wherein at least a portion of the flexible support member is configured to unbend when the at least one of the repositionable upper body support member or the repositionable seat is transitioned from an upright position to a reclined position.

12. The passenger chair of claim 7, wherein the one or more deformable guard members comprise one or more brushes.

13. A passenger chair, comprising:
an arm rest console;
a stationary support member coupled to the arm rest console;
one or more stationary deformable guard members fixed to the stationary support member;
a repositionable upper body support member;
a repositionable seat;
a repositionable support member coupled to at least one of the repositionable upper body support member or the repositionable seat; and
one or more repositionable deformable guard members fixed to the repositionable support member, the one or more repositionable deformable guard members configured to press against at least one of the arm rest console or the one or more stationary deformable guard members, wherein the repositionable support member is configured to maintain the one or more repositionable deformable guard members pressed against the at least one of the arm rest console or the one or more stationary deformable guard members when the at least one of the repositionable upper body support member or the repositionable seat is transitioned from a first position to a second position.

14. The passenger chair of claim 13, wherein the repositionable support member comprises a flexible support member, and at least a portion of the flexible support member bends or unbends to maintain the one or more repositionable deformable guard members pressed against the at least one of the arm rest console or the one or more stationary deformable guard members when the at least one of the repositionable upper body support member or the repositionable seat is transitioned from a first position to a second position.

15. The passenger chair of claim 14, wherein the flexible support member comprises a plurality of segments with flexible joints in between adjacent segments of the plurality of segments.

16. The passenger chair of claim 14, wherein at least a portion of the flexible support member is configured to bend when the at least one of the repositionable upper body support member or the repositionable seat is transitioned from a reclined position to an upright position.

17. The passenger chair of claim 14, wherein at least a portion of the flexible support member is configured to unbend when the at least one of the repositionable upper body support member or the repositionable seat is transitioned from an upright position to a reclined position.

18. The passenger chair of claim 13, wherein the one or more stationary deformable guard members comprise one or more stationary brushes, and the one or more repositionable deformable guard members comprise one or more repositionable brushes.

* * * * *